United States Patent [19]

Andre

[11] Patent Number: 4,804,302
[45] Date of Patent: Feb. 14, 1989

[54] DEFORMABLE LOADING PLATFORM

[75] Inventor: Jean-Luc Andre, Dangolsheim, France

[73] Assignee: Societe Lohr, Hangenbieten, France

[21] Appl. No.: 37,551

[22] Filed: Apr. 13, 1987

[30] Foreign Application Priority Data

Apr. 14, 1986 [FR] France .................................. 86 05419

[51] Int. Cl.$^4$ ................................................ B60P 3/07
[52] U.S. Cl. ......................................... 410/19; 410/30; 410/143
[58] Field of Search .................... 410/3, 4, 7, 8, 9, 19, 410/24, 25, 26, 30, 47, 49, 143; 414/234, 235, 236, 237, 238, 239

[56] References Cited

U.S. PATENT DOCUMENTS 3,605,636  9/1971  Blunden et al. .................... 410/8

FOREIGN PATENT DOCUMENTS 1081830  5/1960  Fed. Rep. of Germany .......... 410/4

Primary Examiner—Robert B. Reeves
Assistant Examiner—Joseph D. Pape
Attorney, Agent, or Firm—Schwartz & Weinrieb

[57] ABSTRACT

A deformable loading platform for vehicle carriers has a plurality of crosspieces which are movable vertically and guided over their movement path, and which are jointly lowerable to form a ramp for running-on of the vehicle carrier, but individually liftable to abut against the vehicle carrier.

14 Claims, 12 Drawing Sheets

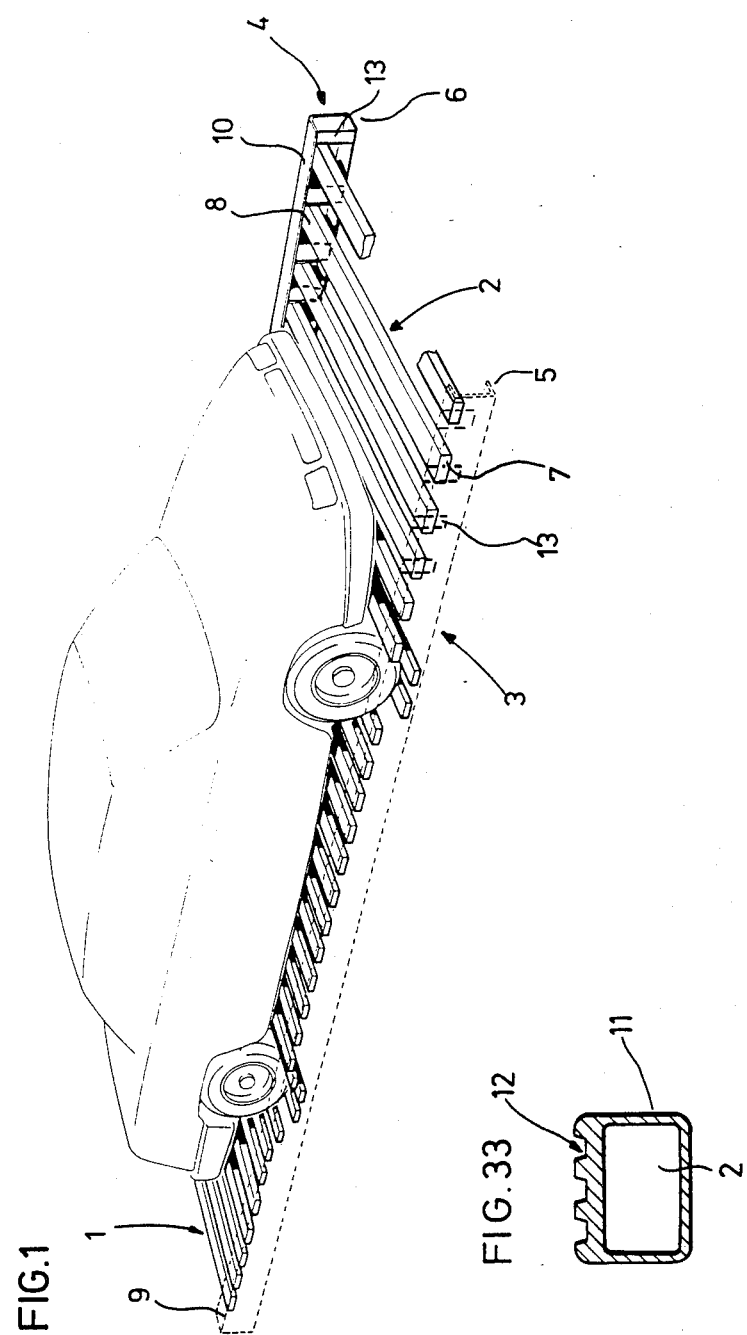

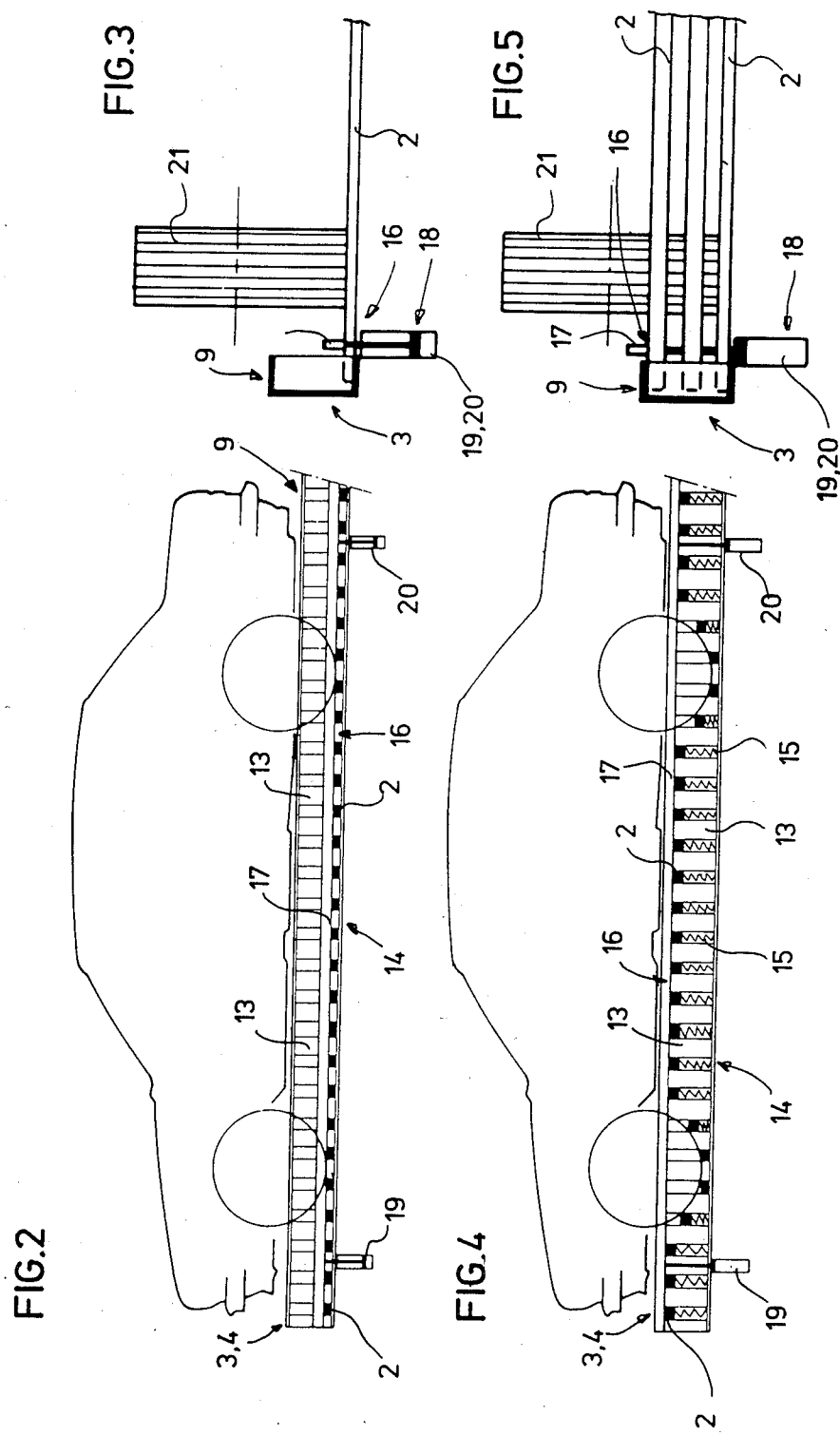

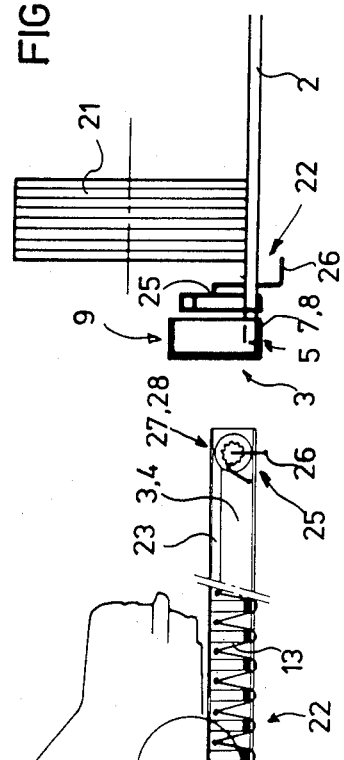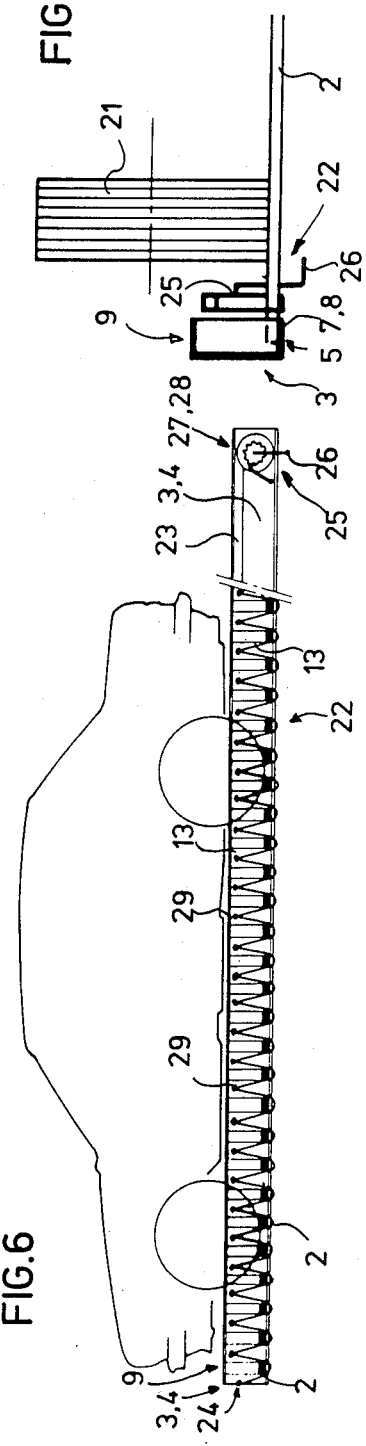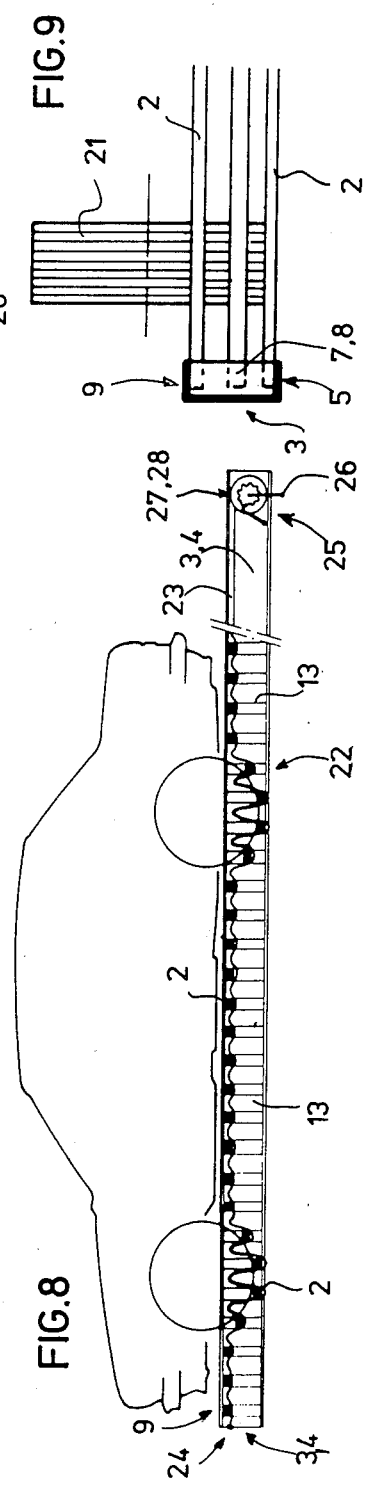

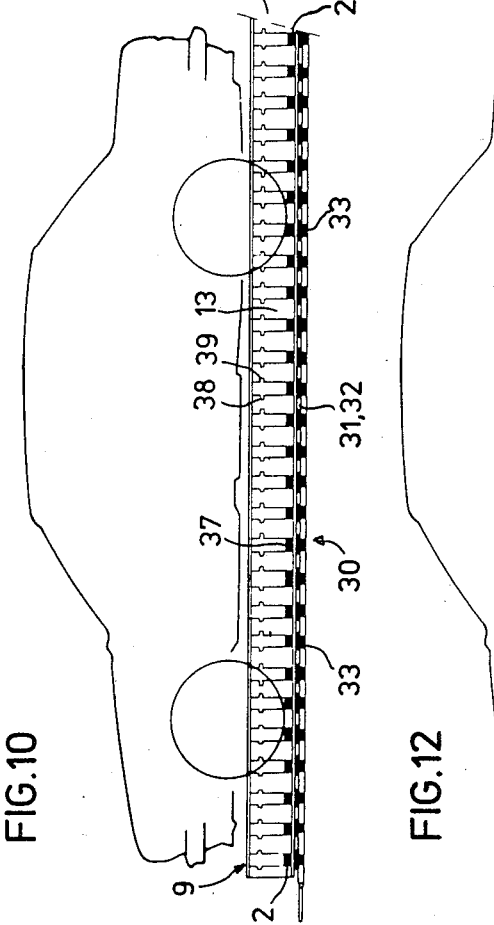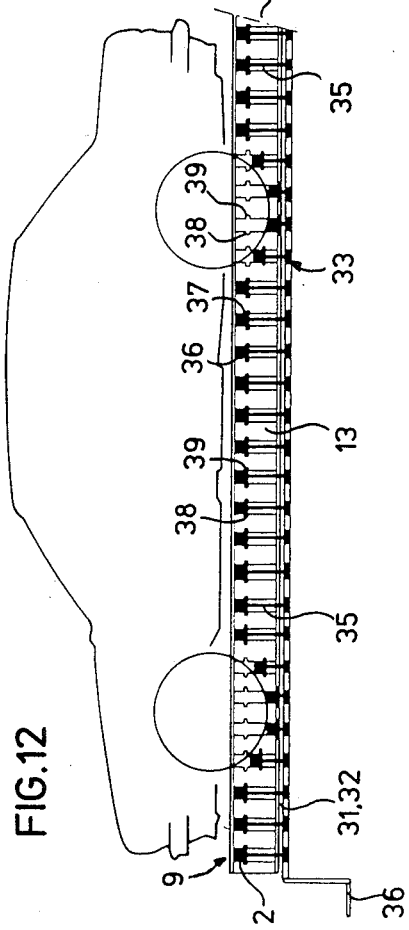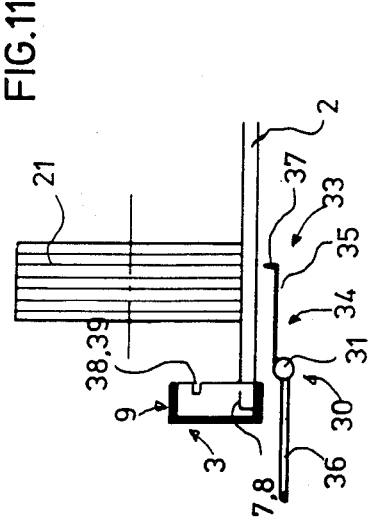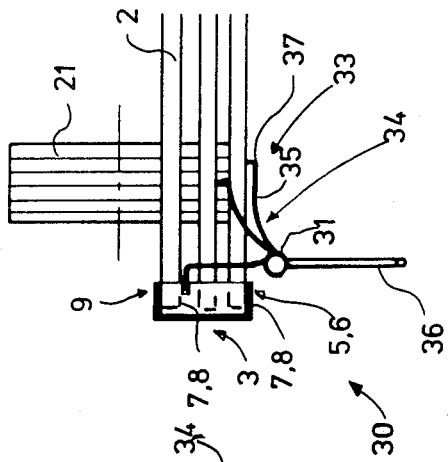

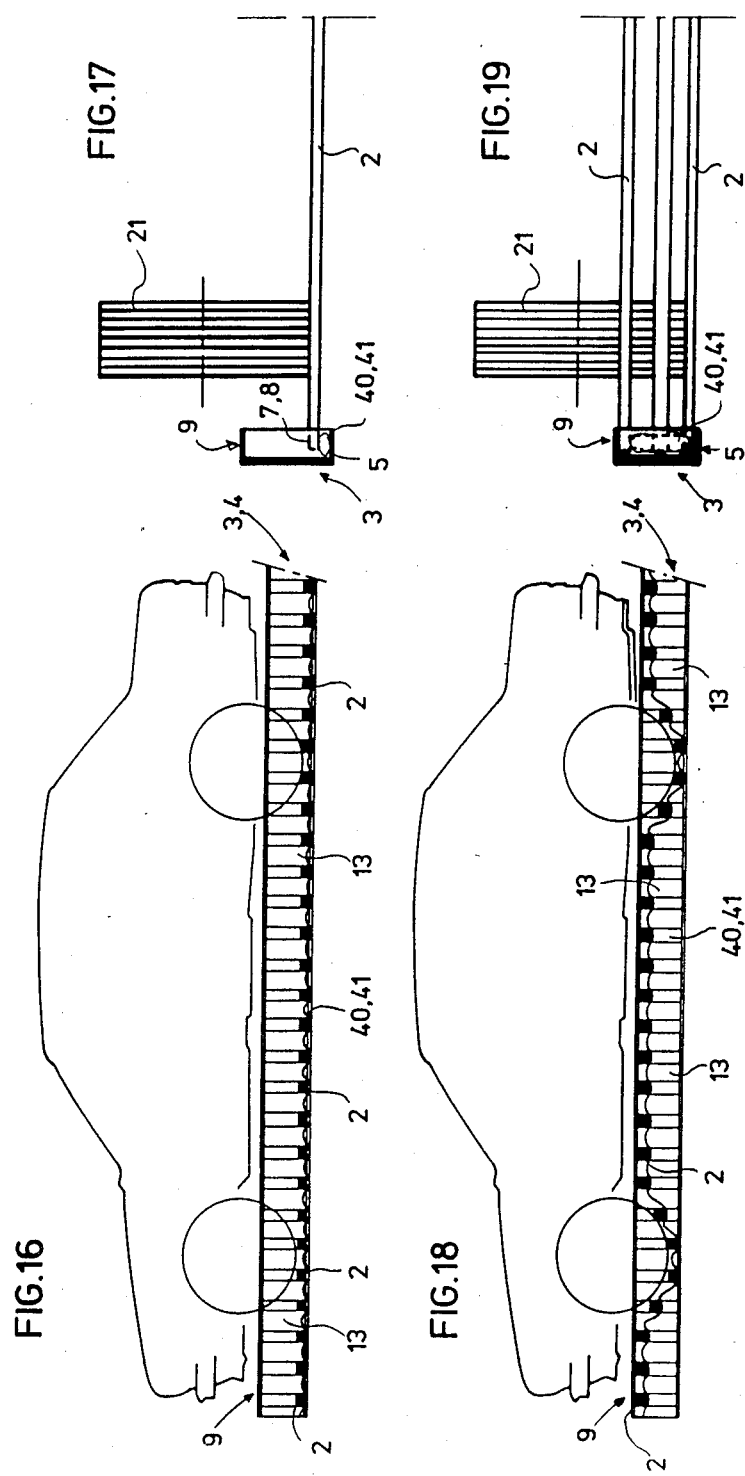

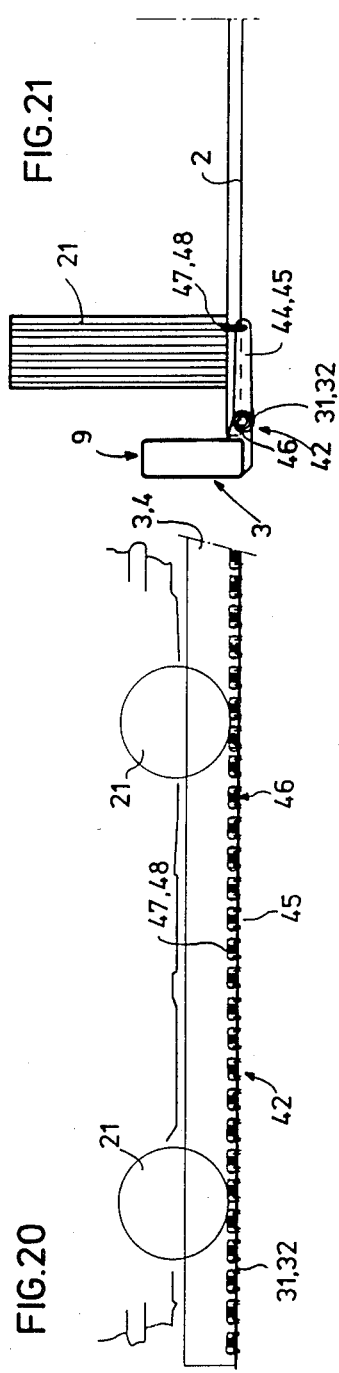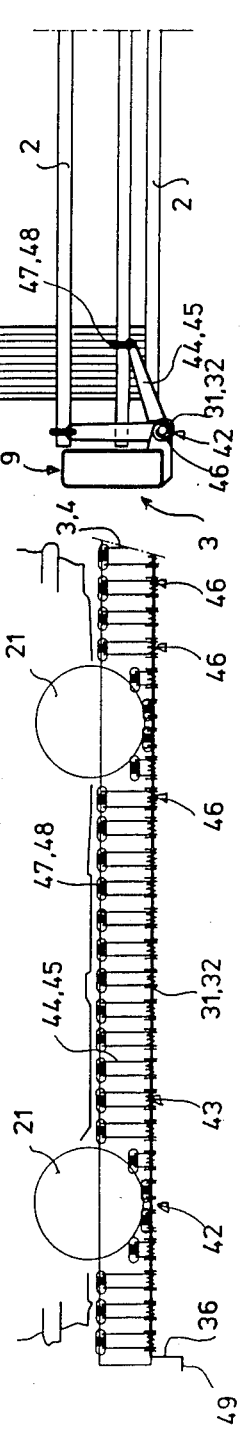

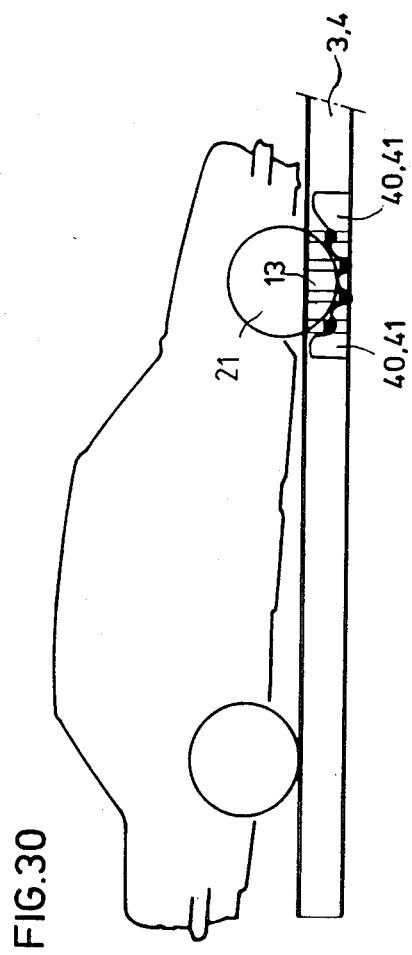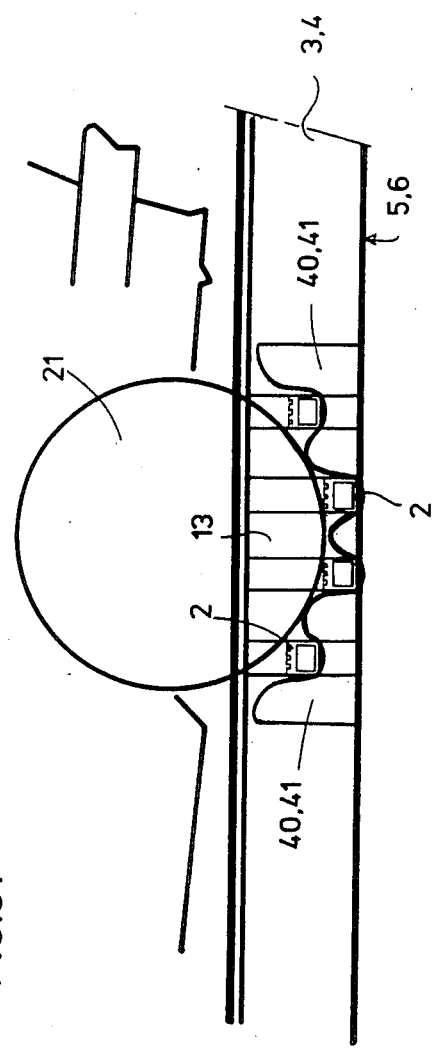
FIG.30
FIG.31

DEFORMABLE LOADING PLATFORM

This invention concerns a deformable loading platform for car-carrier vehicles.

The buiders of car-carrier vehicles have sought to exploit to the maximum the road clearance of the cars transported, in order to decrease the total height of the load, but also to take advantage of the space resulting from lowering the front or rear portion of the car to be transported.

A simple solution especially for increasing the load volume consists in playing with the disposition and with the possibilities of imbricating the cars with respect to one another.

This solution turns out, however, to be very limited in the case of conventional, completely closed decks which define the space between two levels of cars. In addition, the immobilization of the cars is achieved by manipulation and placement of chocks, requiring of the operator inconvenient handling.

One already knows earlier embodiments allowing the utilization as the free volume of the road clearance of a car loaded on the loading platform.

One thus knows from German Patent BEHRENS No. P 24 56 292, embodiments with exact carrying structures in the form of carrying frames within which the wheels come to be lodged, the contact taking place on the crosspieces of the frame.

One also knows embodiments with transverse structures, movable along the girders corresponding to each set of wheels. Each transverse structure forms a true crib for each set of wheels, assuring the immobilization of the vehicle and freeing in this way the available volume corresponding to the road clearance of the vehicle.

One finally knows carrying structures according to which claws form the supports of each wheel. The pivoting arms of those claws make it possible to form a universal support of fast application for each wheel.

Those devices, while advantageous insofar as the loading capacity is concerned, turn out to be of inconvenient application and low speed, consisting of a series of manipulations and adjustments.

Moreover, those earlier embodiments require the use of a solid lower carrying deck, which serves as the driving ramp for both levels of cars.

The present invention has the goal of eliminating these shortcomings. It concerns the following objectives.

One of the first objectives of the present invention is to gain still more height by taking advantage of practically the entire road clearance of the cars transported in order to free an available space under the cars.

Another objective of the invention is to achieve an automatic chocking of the cars, without additional parts being brought onto the loading platform.

Another additional objective of the invention consists in making it possible to entirely automate the chocking operation by a centralized control, assuring the immobilization of the vehicles whatever is the position of the wheels on the loading platform.

To this effect, the invention relates to a deformable loading platform for car-carrier vehicles, characterized by that each loading platform is formed by juxtaposition of vertically movable crosspieces, in association with two longitudinal carrying elements and lifting means, between a low position for the loaded crosspieces, a high position, and an intermediate position, to permit the sets of wheels to be located at the lowest level, immobilized by the crosspieces raised to the intermediate level, and to create under the car a useful free volume, defined by the raised crosspieces, occupied in the loading configuration by the car immediately below, the platform formed by those crosspieces in the low position forming the driving ramp.

The principal advantages of the invention will be listed again below:
gain of space, making possible a larger loading capacity,
employment of simple means,
easy construction,
no manipulation of chocks,
possibility of complete automation of the chocking operation.

The technical characteristics and other advantages of the invention will appear on reading the description which follows, provided by way of a non-limiting example for several embodiments, with reference to the appended drawings, wherein:

FIG. 1 is a schematic perspective view illustrating the geometry of the loading platform in the transport configuration;

FIG. 2 is a longitudinal, sectional view along a girder of a first embodiment with springs in loading configuration;

FIG. 3 is a semi-sectional view corresponding to FIG. 2;

FIG. 4 is a longitudinal sectional view along a girder of the first embodiment with springs in the transport configuration;

FIG. 5 is a transverse semi-sectional view corresponding to FIG. 4 showing a completely lowered crosspiece, a raised crosspiece, and a crosspiece blocked at the intermediate level by the tire of the car being transported;

FIG. 6 is a longitudinal sectional view along a girder of a second embodiment with a cable or a strap in the transport configuration;

FIG. 7 is a transverse sectional view corresponding to FIG. 6;

FIG. 8 is a longitudinal sectional view along a girder of the second embodiment with a cable in the transport configuration;

FIG. 9 is a semi-sectional transverse view corresponding to FIG. 8, showing a fully lowered crosspiece, a raised crosspiece, and a crosspiece blocked at an intermediate level by the tire of the car being transported.

FIG. 10 is a longitudinal sectional view along a girder of a third embodiment of the loading platform with lifting and blocking fingers, in the loading configuration;

FIG. 11 is a transverse semi-sectional view corresponding to FIG. 10;

FIG. 12 is a longitudinal sectional view along a girder of the third embodiment with lifting and blocking fingers in the transport configuration.

FIG. 13 is a transverse semi-sectional view corresponding to FIG. 12, with a representation of the lifting fingers in two extreme positions and one intermediate position of the crosspieces;

FIG. 16 is a longitudinal sectional view along a girder of a fourth embodiment, with a pneumatic cylinder in the loading configuration;

FIG. 17 is a view corresponding FIG. 16 in a transverse cross-section;

FIG. 18 is a longitudinal sectional view along a girder of the fourth embodiment with a pneumatic cylinder in the transport configuration;

FIG. 19 is a semi-sectional transverse view corresponding to FIG. 18, showing a completely lowered crosspiece, a raised crosspiece, and a crosspiece blocked at an intermediate level by the tire of the car being transported.

FIG. 20 is a longitudinal sectional view along a girder of a fifth embodiment, which is a variant of the third embodiment;

FIG. 21 is a transverse cross-section corresponding to the embodiment of FIG. 20;

FIG. 22 is a longitudinal sectional view along a girder corresponding to the fifth embodiment in the transport configuration;

FIG. 23 is a transverse semi-sectional view corresponding to FIG. 22 representing the lifting lever in an intermediate position and in an extreme position;

FIGS. 30 and 31 are general, longitudinal, sectional views and an enlargement of a variant with a deformable platform of a limited area according to the fourth embodiment;

FIG. 33 is a transverse cross-section of an example of the shape of cross-section of crosspieces.

Figure 14:
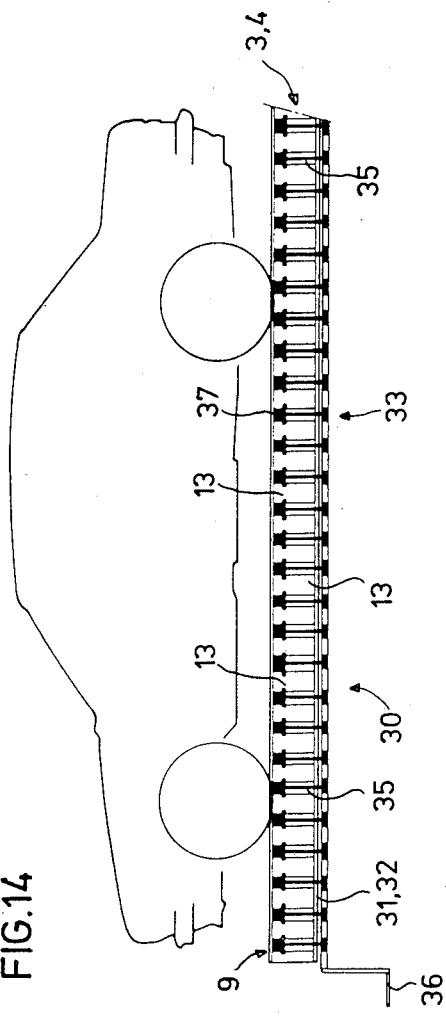
FIGS. 14 and 15 are longitudinal and transverse sectional views of the third embodiment, the loading platform blocked in the high position.

The general inventive idea consists in producing a carrying platform, called loading platform 1, by a longitudinal sequence of crosspieces arranged in a lateral juxtaposition, either continuous, that is side by side, or separated by an interval, each crosspiece being mounted individually vertically movable along the girders running along the edges of the loading platform, between a low position and a high position so as to make possible raising of the crosspieces not in contact with the wheels, making available in this manner an optimum useful volume under the body for placing other cars. The crosspieces are mounted upwardly returnable by various mechanical means, especially by forces of elastic type. In this way, the crosspieces forced downwardly by the weight of the car transferred to the wheels are immobilized in an intermediate or lower position.

More precisely, the general means indicated above are reduced to practice by the particular following means.

Referring to FIG. 1, the crosspieces 2 are installed in parallel, in linear sequences forming longitudinally between two longitudinal profiles or carrying girders 3 and 4. Those exhibit a baseplate 5 or 6 on which rest the ends 7 and 8 of the crosspieces in the low position. The crosspieces are installed vertically movable transversely to the girders, between a low position in which the ends rest on the baseplates 5 and 6 of the girders, and a high position, in which said ends 7 and 8 abut against the upper edges of the girders 3 and 4.

Naturally, the vertical play of the crosspieces is compatible with the average road clearance of the cars to be transported. If necessary, it will be possible to provide a control of the play of the crosspieces by limiting the stroke of their control means.

The crosspieces 2 are formed, for example, as tubular profiles 11 with a top surface provided with grooves such as 12 or other antiskid or drainage structures. An embodiment is shown in FIG. 33.

The crosspieces 2 are preferably made of a light alloy.

They are mounted vertically movable along the edges of the vertical separation plates such as 13 with which the girders 3 and 4 are provided, for example, parallel to the open vertical face. The vertical edges of those plates serve as vertical guides of the crosspieces 2 in their vertical movements between their low position and their high position.

Several variants of the means for returning to the high position will be studied below. It should nevertheless be mentioned first that the crosspieces can be raised manually in a simplified version and blocked in a high or intermediate position by any mechanical locking device.

Referring to FIGS. 2 to 5, according to the first embodiment, the crosspieces 2 mounted vertically movable, exhibit, intercalated between their ends 7 and 8 and the portion of the baseplate 5 or 6, with respect to the girders, individual devices 14 for returning to the high position by means of springs 15.

The springs 15 are mounted in vertical expansion for returning the crosspieces to the high position. Along each girder, a linear lowering element 16 is provided, for example, a corner iron or a knife 17 functioning as a rail which will rest simultaneously on all the crosspieces for lowering them together into a lower position, thus forming a driving ramp for the cars to be placed.

This rectilinear lowering element 16 is actuated, for example, by a hydraulic mechanism 18 of the type having pulling jacks 19 and 20, whose driving fluid will return all of the crosspieces together, and thus the loading platform, into the low position, thus forming the driving ramp necessary for loading. In the loading configuration, the pulling mechanism will be released, and all the crosspieces not covered by wheels of the car or of the vehicle will be returned to the high position by action of the springs 15. The crosspieces adjacent those forced into the low position by the wheel of the vehicle being loaded come to abut in the intermediate position against the corresponding tire 21.

According to a second embodiment shown in FIGS. 6 to 9, the return of the ends 7 and 8 of the crosspieces to the upper position is assured by a suspension assembly with a tensioning device 22. According to the embodiment shown, a tie 23, for example, a cable or a strap, support the crosspieces in the lower portion of each of their ends. This tie, attached to one of the ends 24, is wound on a spool or a drum 25 manually actuated by means of a crank 26 or driven by a motor through a tensioning device 27, for example, provided with a pawl 28.

Its course along the girders is formed by a sequence of passes under the ends of the crosspieces 2 and pickups with return to the upper portion by a pulley such as 29 arranged in each interval in the high position, so as to bring about individual lifting at the level of each crosspiece.

The ties 23 corresponding to each girder are mounted slidably under the ends 7 and 8 of the crosspieces 2.

When a controlled pull is exerted on the tie 23, the length of the loops carrying each crosspiece between two consecutive pulleys 29 decreases and brings along the non-load bearing crosspieces 2 until the abutting contact with the tires or with the upper edges 9 and 10 of the girders 3 and 4. This tension will be maintained by locking of the pawl device 28 of the driving drum.

This embodiment makes it possible in certain particular applications, by increasing the force exerted on the tie, to raise evenly the crosspieces supporting the tires, to make available, by eliminating the recesses, an undeformed platform, allowing the release of the vehicle.

A third embodiment, shown in FIGS. 10 to 13, represents a lifting mechanism 30 shared by each row of ends of crosspieces 7 or 8, that is, shared by each girder 3 or 4 in the form of a control shaft 31 or 32 on which are mounted individual lifting devices 33 in the form of lifting and blocking fingers 34. Each one of these fingers consists of a flexible arm 35 integral with the control shaft 31 or 32, actuated by a control lever 36, the arm being terminated by a blocking member 37.

The contact of the upward push of the end of the blocking member 37 with the lower side of the crosspieces makes it possible to raise them to the upper level abutting against the upper edges of the girders 3 or 4.

Figure 15:
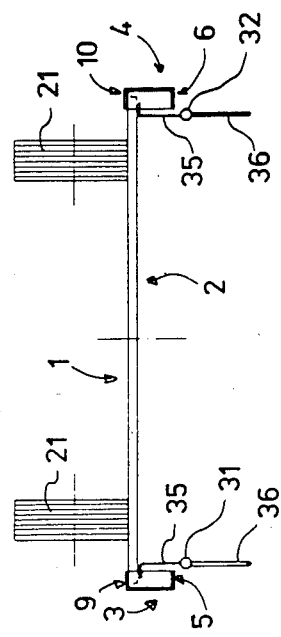

The blocking member 37 forming the end of the lifting fingers are adapted in a manner to allow bringing about of locking in the high position of each one of the crosspieces in order to block the loading platform in the high position, corresponding to certain loading configurations (FIGS. 14 and 15).

Thus, sections of profiled elements will be suitable, for example, corner pieces of a width slightly larger than that of the crosspieces 2.

According to the characteristics of the embodiment shown in FIGS. 10 to 13, those sections of cornerpieces will fit into the transverse notches 38 and 39 provided in the separating plates 13 forming a guide at a level such that the so defined interval is equal to the thickness of a crosspiece, in order to permit blocking of the loading platform in the high position.

A fourth embodiment with pneumatic lifting is illustrated in FIGS. 16 to 19. According to this embodiment, there is provided, lodged within the internal volume of each girder 3 and 4 closed off by the guideplates 13, a pneumatic cylinder such as 40 or 41, connected to a source of compressed air through a control member (not shown).

This cylinder constitutes an equivalent means for obtaining lifting of the crosspieces 2 for the purpose of allowing the operation of the deformable loading platform according to the invention.

The cylinder used may assume any generally appropriate form giving it a particular capability of deforming vertically under the effect of compressed air.

Further, it will have a small volume in its lowest position, so as not to constitute a hampering thickness, which would elevate in an exaggerated manner the low level of the crosspieces.

The cylinder 40 or 41 is represented on the corresponding figures by the rounded line between the crosspieces.

An additional embodiment shown in FIGS. 20 to 23 makes use of a mechanism with a control shaft such as 31 or 32, already described, and a lifting mechanism shared by each row of ends 7 or 8 of crosspieces, that is, shared by each girder 3 or 4, control shaft 31 or 32 on which are mounted the individual devices 43 with a lifting arm 44. Each one of these devices is formed by a rigid lever 45, integral with the control shaft 31 or 32 through an elastic joint, for example, a torsion spring 46, each lever being terminated by a guidepiece 47.

The guidepieces 47 forming the end of the lifting arm 44 are adapted so as to maintain and guide the ends 7 or 8 of the crosspieces 2. An example of reduction to practice makes use of ends provided with sliding rings 48 of a width slightly larger than that of the crosspieces 2.

In the low position, the ends 7 or 8 of the crosspieces 2 rest on a control shaft 31 or 32, serving in this embodiment as the lower support. The longitudinal immobilization of the crosspieces 2 is assured by the guidepieces in the form of rings 48, in which the ends 7 or 8 of the crosspieces are gripped and slidably constrained.

By actuating the crank 49 of the control shaft 31 or 32 so as to pivot the lifting arm 44, the crosspieces 2 not under load of the wheels of the vehicle will be raised to the high position and maintained in that position by the arm 44 and the end ring 48. The crosspieces under load remain in the low position on the control shaft 31 or 32, the arms 44 maintaining their original position thanks to the elastic joint. The other arms remain in an intermediate position in contact with the tires, kept in that position by the arms 44 maintained in a slanted position by the action of the elastic joint.

This embodiment makes it possible to form a loading platform with two positions. A first, low position, obtianed with the lifting arms 44 being horizontal, the ends 7 and 8 of the crosspieces 2 resting on the control shaft, and a second, high position obtained with the lifting arms 44 being vertical, the ends 7 and 8 of the crosspieces resting on the end ring 48.

It goes without saying that other means for actuating or activating the crosspieces with upward return can be imagined, for example, with an electromagnet or hydraulic, or any other. Those means are comprised within the general inventive concept flowing from the foregoing description.

The general inventive idea allows an immediate extension, which consists in making platforms deformable only within limited areas, namely, even with and on both sides of the zones extending over the locations and the positions of contact of the sets of wheels with the loading platform.

Figure 24:
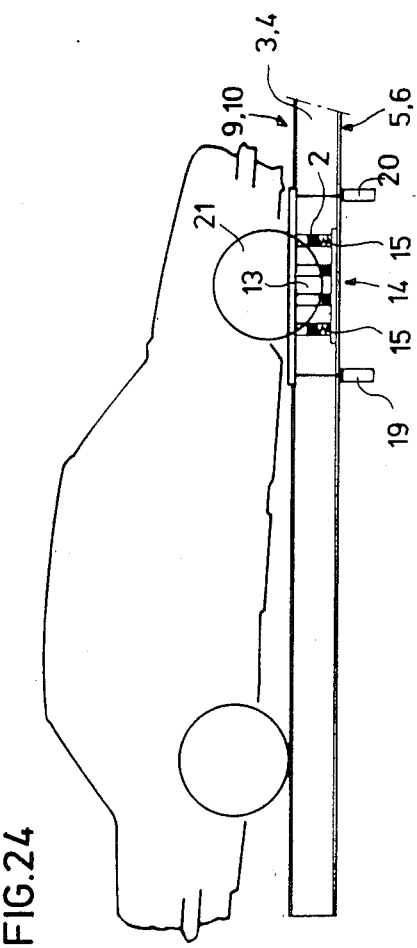
FIGS. 24 and 25 are general, longitudinal, sectional views and an enlargement of a variant with a deformable platform of a limited area according to the first embodiment.
Figure 32:
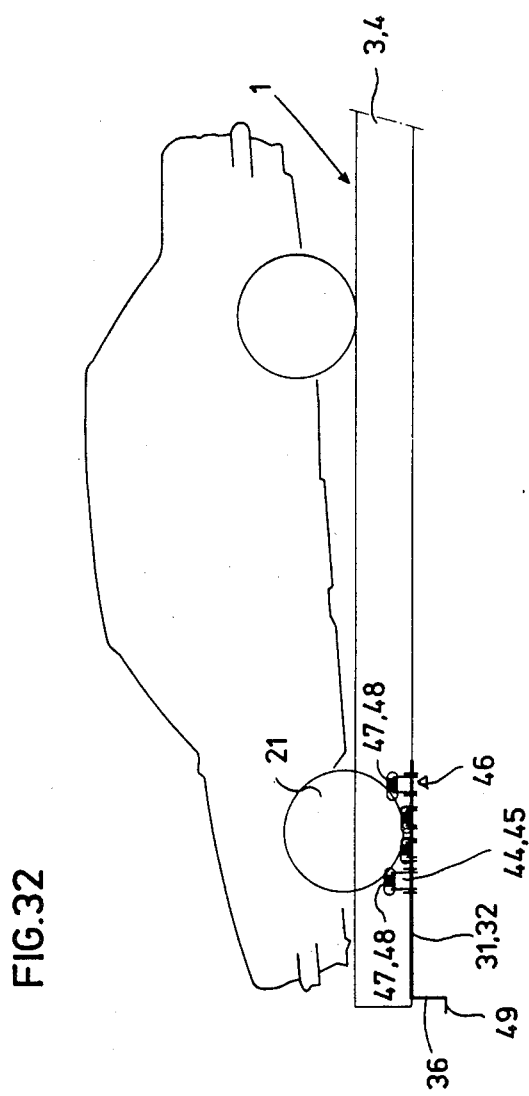
FIG. 32 is a longitudinal sectional view of the fifth embodiment of a variant with a deformable platform of a limited area.

FIGS. 24 and 32 illustrate these variants.

Figure 25:
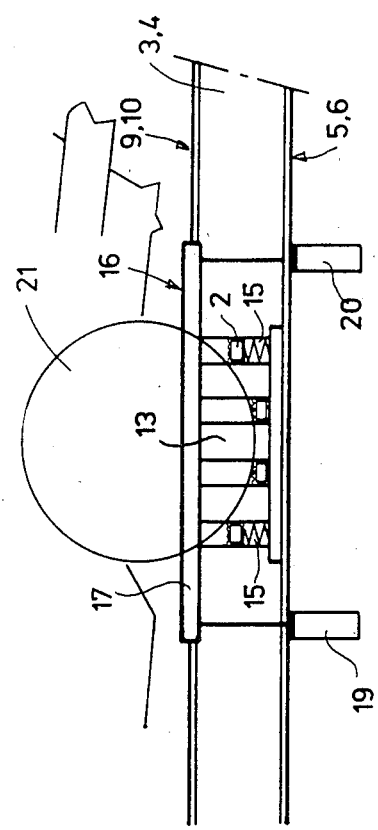
Figure 26:
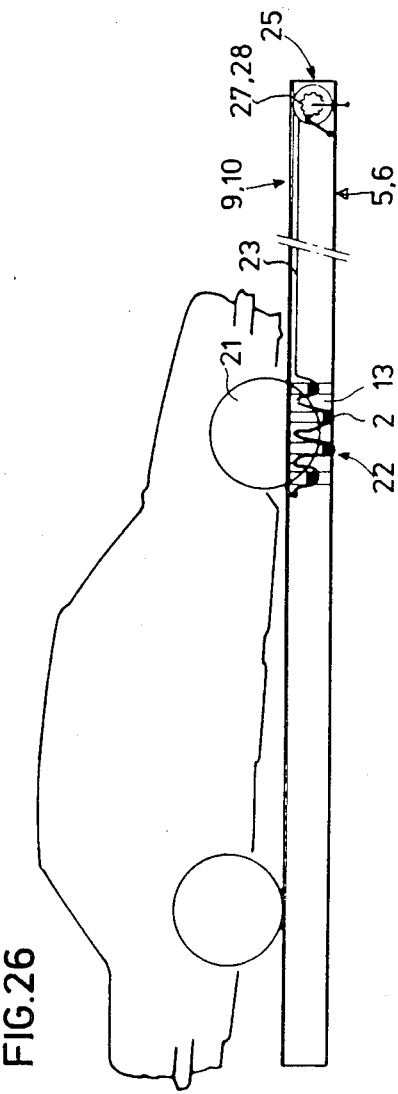
FIGS. 26 and 27 are comprehensive, longitudinal, sectional views and an enlargement of a variant with a deformable carrying platform of a limited area according to the second embodiment.
Figure 27:
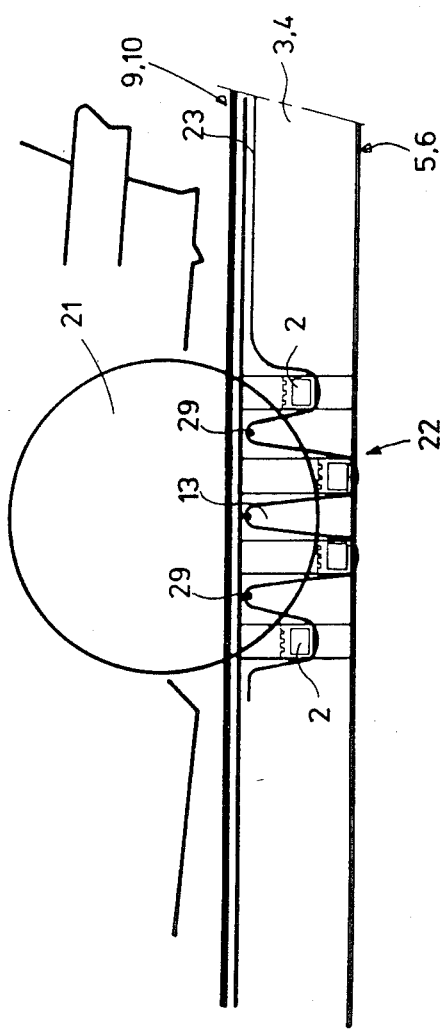
Figures 28, 29:
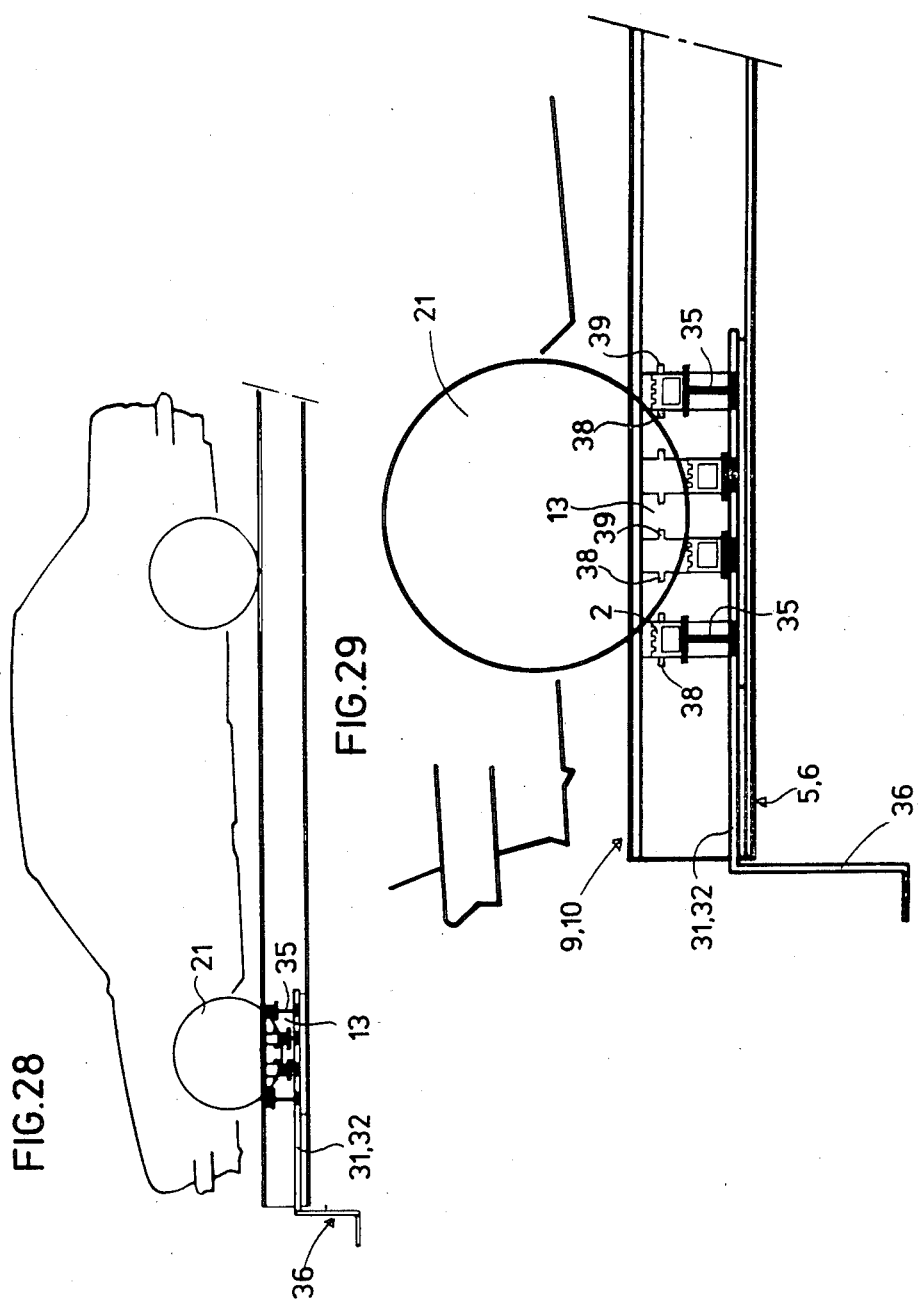
FIGS. 28 and 29 are general, longitudinal, sectional views and an enlargement of a variant with a deformable platform of a limited area according to the third embodiment.

All the above-described embodiments turn out to be feasible: the spring devices (FIGS. 24 and 25), the mechanisms with cable or strap (FIGS. 26 and 27), the lifting assembly with blocking fingers (FIGS. 28 and 29), lifting by means of pneumatic cylinders (FIGS. 30 and 31), and lifting by means of arms with sliding rings 48 (FIG. 32).

These variants consist of the same elements, which will be accordingly referred to in the same way.

These variants will be preferred for reason of cost, but also because of simplicity of use. They offer the advantage of providing an immediate and effective chocking, without requiring the use of removable chocks.

As indicated above, the embodiments shown and the foregoing variants do not in any way represent a limitation of the possible means permitting the reduction to practice of the invention. Thus, all the direct variants, all equivalent means, and all modifications without inventive contribution are perfectly well comprised within the scope of the present invention.

I claim:

1. Deformable loading platform for vehicle carriers, characterized by a sequence of crosspieces movable in a vertical direction between a lower position and an upper position;
   means for guiding the crosspieces over their whole vertical movement between the lower and upper positions;
   means for jointly moving all the crosspieces vertically downwardly to allow driving a vehicle carrier onto the platform with all the crosspieces having simultaneously moved vertically downwardly;
   means for lifting the crosspieces vertically upwardly and individually independently of one another, and located under the crosspieces, so that with the vehicle carrier on the platform the lifting means bias the respective crosspieces individually vertically upwardly toward abutment against the vehicle carrier, while with no vehicle carrier on the platform the lifting means bias all the crosspieces vertically upwardly to the upper position.

2. Loading platform according to claim 1, characterized by two longitudinal girders having lower and upper edges between which the crosspieces are movable in a vertical direction and that the lifting means are springs provided between the lower edges of the girders (3 or 4) and the ends (7) and (8) of the crosspieces, a lowering device in the form of a rectilinear element (16), actuated by a hydraulic assembly (18), maintaining the crosspieces in the low position during loading.

3. Loading platform according to claim 1, characterized by that the lifting means is a device tensioning a tie (23), said tie sliding under the crosspieces and being returned to the upper edge of the platform by a return pulley (29), the cable being tensioned by a spool or drum device (25) possessing a mechanism (27) for locking under tension.

4. Loading platform according to claim 1, characterized by that the lifting means has lifting fingers mounted on a common shaft (31) or (32), said fingers being formed by a flexible arm (35), each terminated by a blocking member (37).

5. Loading platform according to claim 1, characterized by that the lifting means is a pneumatic cylinder (40 or 41).

6. Loading platform according to claim 1, characterized that there are mounted on a common control shaft (31) or (32) individual lifting devices (43) in the form of a lifting arm (44), each comprising a rigid lever (45) attached to the shaft (31) or (32) by means of an elastic joint, each lever terminating by a guidepiece (47).

7. Loading platform according to claim 6, characterized by that the guidepieces (47) forming the end of the arm (44), each comprise a sliding ring (48), allowing the ends to be slidingly constrained along the girders during their lifting.

8. Loading platform according to claim 1, characterized by two longitudinal carrying elements between which the crosspieces are movable in a vertical direction.

9. Loading platform according to claim 8, characterized by that the longitudinal carrying elements are the girders (3) and (4).

10. Loading platform according to claim 1, characterized in that the means for guiding the crosspieces are formed by a plurality of plates located so that each of the crosspieces is guided between two of the plates.

11. Loading platform according to claim 10, characterized by two longitudinal carrying elements between which the crosspieces are movable in a vertical direction.

12. Loading platform according to claim 11, characterized in that the carrying elements are girders having lower and upper edges, and by that the plates connect the upper and lower edges of the girders.

13. Loading platform according to claim 1, characterized by blocking members which maintain all the crosspieces in the upper position.

14. Loading platform according to claim 13, characterized in that the blocking member are formed as linear profiled sections.

* * * * *